United States Patent [19]

Ichikawa et al.

[11] Patent Number: 5,352,104
[45] Date of Patent: Oct. 4, 1994

[54] POST-CURE INFLATOR

[75] Inventors: Katsumi Ichikawa; Keiji Ozaki; Akihiko Masagaki, all of Kobe, Japan

[73] Assignee: Kabushiki Kaisha Kobe Seiko Sho, Kobe, Japan

[21] Appl. No.: 960,867

[22] Filed: Oct. 14, 1992

[30] Foreign Application Priority Data

Oct. 15, 1991 [JP] Japan .................. 3-296396

[51] Int. Cl.$^5$ ............................................ B29C 35/16
[52] U.S. Cl. ............................... 425/58.1; 425/40
[58] Field of Search ............... 156/414, 415, 416, 417, 156/394.1; 425/58.1, 40, 44; 264/502; 503/375, 355

[56] References Cited

U.S. PATENT DOCUMENTS

| | | | |
|---|---|---|---|
| 2,688,173 | 9/1954 | Van Peet | 403/322 |
| 3,024,052 | 3/1962 | Oliveau | 403/375 |
| 3,605,182 | 9/1971 | Ulm | 425/58.1 |
| 4,092,090 | 5/1978 | Yuhas et al. | 425/58.1 |
| 4,558,842 | 12/1985 | Peil et al. | 403/375 |
| 4,798,647 | 1/1989 | Haas | 156/414 |
| 4,867,595 | 9/1989 | Hoffman | 403/322 |
| 4,930,932 | 6/1990 | Le Vahn | 403/324 |
| 5,225,138 | 7/1993 | Irie | 425/58.1 |

FOREIGN PATENT DOCUMENTS 55-169417  12/1980  Japan .

*Primary Examiner*—Michael W. Ball
*Assistant Examiner*—Richard Crispino
*Attorney, Agent, or Firm*—Oblon, Spivak, McClelland, Maier & Neustadt

[57] ABSTRACT

A post-cure inflator wherein an upper rim is automatically exchanged. A locking shaft is mounted for rotation on a rotary frame, and an upper rim support is mounted for rotation on the locking shaft. An upper rim is removably supported on the upper rim support. Also a lower rim support is removably supported on the locking shaft, and a lower rim is removably supported on the lower rim support and cooperates with the upper rim to hold therebetween a vulcanized tire, into which high pressure air is blown to inflate and cool the tire. The upper rim support and the upper rim have cooperating tapered fitting portions, and the upper rim has an outer peripheral circumferential groove formed at an upper portion thereof. A latching member is mounted on the upper rim support for movement into and out of the outer peripheral circumferential groove of the upper rim. The upper rim support includes a first member secured to the rotary frame and a second member mounted for movement into and out of contact with the first member, and a lifting apparatus is disposed on one of the first and second members and moves the second member toward and away from the first member.

5 Claims, 8 Drawing Sheets

POST-CURE INFLATOR

BACKGROUND OF THE INVENTION

1. Field of the Invention

This invention relates to a post-cure inflator for inflating and cooling a vulcanized rubber tire, and more particularly to an apparatus for automatically exchanging an upper rim in a post-cure inflator.

2. Description of the Related Art

Conventionally, a post-cure inflator of the vertically alternating type called turnover type is widely used which includes two sets of upper and lower rims for holding a tire therebetween provided for a single cavity of a tire vulcanizing machine in order to make the inflating and cooling time for a vulcanized tire longer than one cycle time of the tire vulcanizing machine. The upper and lower rims of the post-cure inflator must necessarily be exchanged according to the size of a vulcanized tire. To this end, according to a conventionally common practice, the upper and lower rims of each set are mounted on upper and lower rim supports. respectively, by means of bolts.

Another post-cure inflator is also known and disclosed, for example, in Japanese Utility Model Laid-Open Application No. 55-169417 wherein a rim support has a hole formed therein and a securing member having a hooked portion which can be inserted into the hole of the rim support and can be contracted is secured to a rim and then the hooked portion of the securing member is contracted so that the rim can be mounted and removed readily.

However, particularly when an upper rim is to be mounted, the operator must lift the heavy upper rim to the upper rim support located at an upper portion of the post-cure inflator and then, while the upper rim is kept lifted, look into the upper rim from below and tighten the bolts. Even if the bolts are replaced by such hooked portions as described above, the operator must look into the holes formed in the upper rim support from below and perform the operation while the upper rim is kept lifted until the hooked portions are successfully fitted into the holes. In this manner, the operation of exchanging an upper rim has a problem that it is dangerous due to bad scaffolding and is difficult to perform since the weight of a rim increases as the diameter of a tire increases and besides an upper rim support is located at a higher location in the post-cure inflator while a lower rim, a lower rim support and so forth are installed at a lower location in the post-cure inflator which makes the scaffolding.

SUMMARY OF THE INVENTION

It is an object of the present invention to provide a post-cure inflator wherein an upper rim is automatically exchanged.

In order to attain the object, according to the present invention, there is provided a post-cure inflator, which comprises a rotary frame, a locking shaft mounted for rotation around an axis thereof on the rotary frame, an upper rim support mounted for rotation on the locking shaft, an upper rim removably supported on the upper rim support, a lower rim support removably supported on the locking shaft, a lower rim removably supported on the lower rim support for cooperating with the upper rim to hold a vulcanized tire therebetween, means for inflating and cooling the vulcanized tire held between the upper and lower rims, the upper rim support and the upper rim having tapered fitting portions for cooperating with each other, the upper rim having an outer peripheral circumferential groove formed at an upper portion thereof, and a latching member mounted on the upper rim support for movement into and out of the outer peripheral circumferential groove of the upper rim. Preferably, the upper rim support includes a first member secured to the rotary frame and a second member mounted for movement into and out of contact with the first member, and the post-cure inflator further comprises a lifting apparatus disposed on one of the first and second members for moving the one of the first and second members toward and away from the other of the first and second members.

With the post-cure apparatus, since the tapered fitting portions are provided on the upper rim support and the upper rim, as the upper rim and the upper rim support are moved toward each other in order to attach the upper rim to the upper rim support, the upper end of the upper rim is guided by the tapered fitting portion of the upper rim support so that the tapered fitting portions of the upper rim and the upper rim support are contacted with each other. Then, the latching member mounted on the upper rim support is fitted into the outer peripheral circumferential groove of the upper rim thereby to attach the upper rim to the upper rim support. The upper rim support includes the first and second members, and after the upper rim is placed onto the lower rim and then lifted together with the lower rim to an attaching position, the second member of the upper rim support is moved down to the mounting position, at which the upper rim is attached to the second member, whereafter the upper rim is lifted to a predetermined position by the second member.

Thus, since, when the upper rim is lifted, it is guided by the tapered fitting portion of the upper rim support so that the tapered fitting portions of the upper rim and the upper rim support are fitted with each other and the latching member mounted on the upper rim support is fitted into the outer peripheral circumferential groove of the upper rim to attach the upper rim to the upper rim support, such labor as to lift the upper rim and register threads with threaded holes as with the conventional post-cure inflator described above is eliminated. If a suitable vertical distance can be assured between the upper and lower rims, the upper rim can be attached in position only by lifting the lower rim by means of a lifting apparatus therefor. Automation of exchanging of the upper and lower rims is achieved thereby. Further, the post-cure inflator can be manufactured readily by securing one member on the existing rim, and the post-cure inflator itself need not be modified to a great extent.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 5:
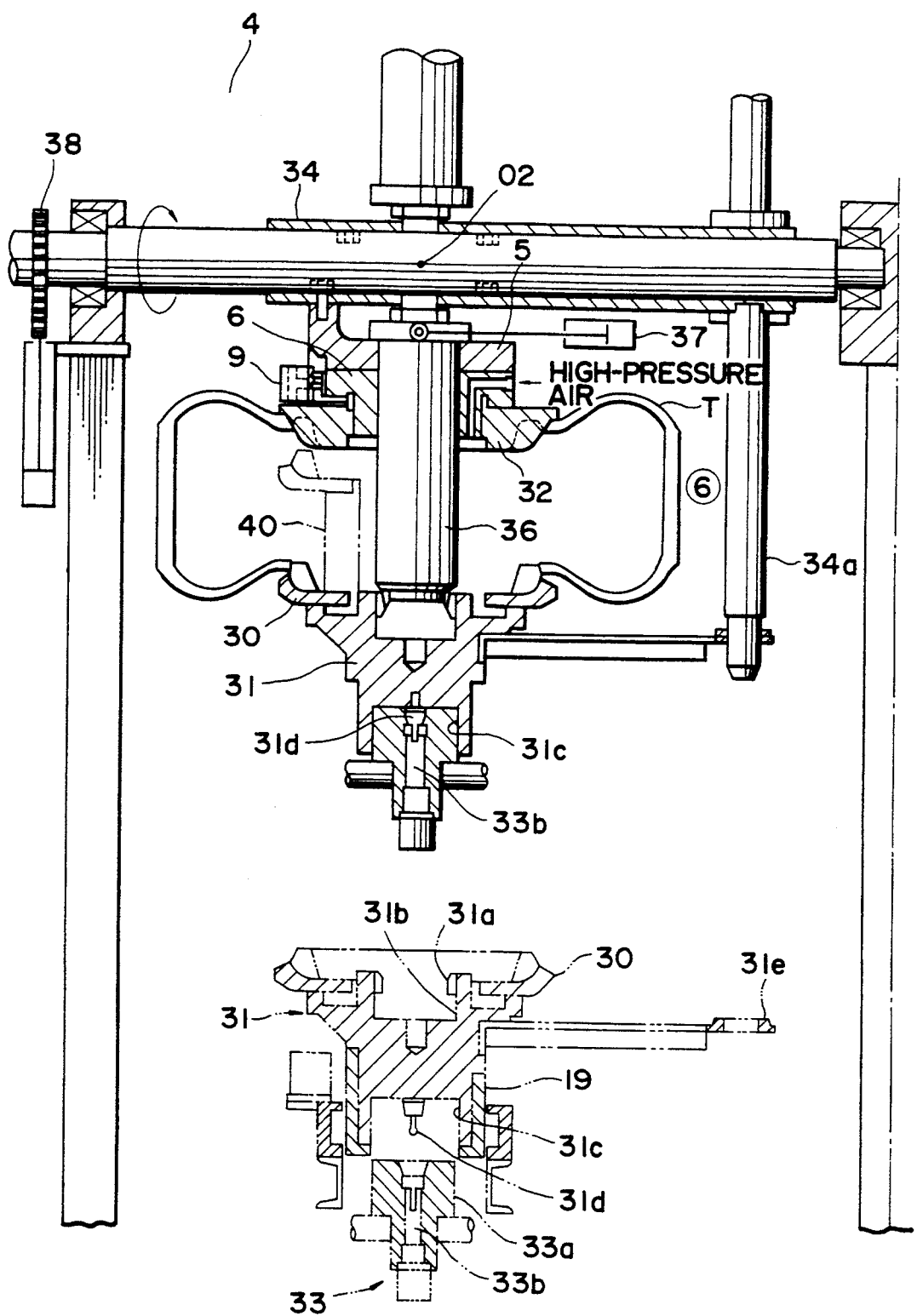
FIG. 5 is a reduced side elevational sectional view of the post-cure inflator machine of FIG. 1.

Referring first to FIG. 5, there is shown structure of essential part of a post-cure inflator machine to which the present invention is applied. The post-cure inflator machine shown includes a post-cure inflator 4 which includes two sets of lower and upper rims 30 and 32 disposed for movement toward and away from each other and also for vertically alternating movement with respect to the central point 02. High pressure air is blown into a vulcanized tire T held between the lower and upper rims 30 and 32 of one set to effect inflation and cooling of the tire T at the position ⑥ in FIG. 5. Essential part of the post-cure inflator 4 has such structure as follows.

In particular, a rotary frame 34 is located at an upper portion of the post-cure inflator 4 and is rotated by 180° by means of a rack and pinion apparatus 38. A first member 5 of an upper rim support is secured to the rotary frame 34, and a locking shaft 36 extends through the centers of the first member 5 and a second member 6 of the upper rim support which is moved upwardly and downwardly toward and away from the first member 5 by a cylinder apparatus not shown. The locking shaft 36 is mounted vertically on an upper face of the first member 5 for rotation over a predetermined angle by a cylinder apparatus 37. A lower rim 30 is integrally screwed to a lower rim support 31 with a spacer or spacers interposed therebetween for adjusting the vertical position of the lower rim 30. The lower and upper rims 30 and 32 are integrated with each other by passing a male arresting formation 36a at the other end of the locking shaft 36 through a female arresting formation 31a of the lower rim support 31 and rotating the locking shaft 36 by a predetermined angle to rotate the male arresting formation 36a in a spacing 31b of the lower rim support 31.

A lifting apparatus 33 is located at a lower portion of the post-cure inflator 4 and moves the lower rim support 31 upwardly and downwardly. The lower rim support 31 has a hole 31c formed at a lower portion thereof, and an arresting pin 31d is formed uprightly at the center of the hole 31c. Meanwhile, the lifting apparatus 33 has, at an end thereof, a cylindrical portion 33a in which an openable an closeable collet chuck 33b is disposed. The lifting apparatus 33 is lifted to attach the lower rim 30 to the end of the locking shaft 36 as described above. In this instance, a positioning ring 31e on a side face of the lower rim support 31 is fitted onto a guide 34a provided uprightly on the rotary drum 34 to prevent letting off of the lower rim support 31 from the guide 34a. Meanwhile, when the cylindrical portion 33a of the lifting apparatus 33 is inserted in the hole 31c of the lower rim support 31 and the lower rim support 31 is released from the locking shaft 36, the arresting pin 31d is arrested and pulled down by the collet chuck 33b. Consequently, the lower rim support 31 pulls down the tire T overcoming the attracting force between the tire T and the upper rim 32.

Figure 1:
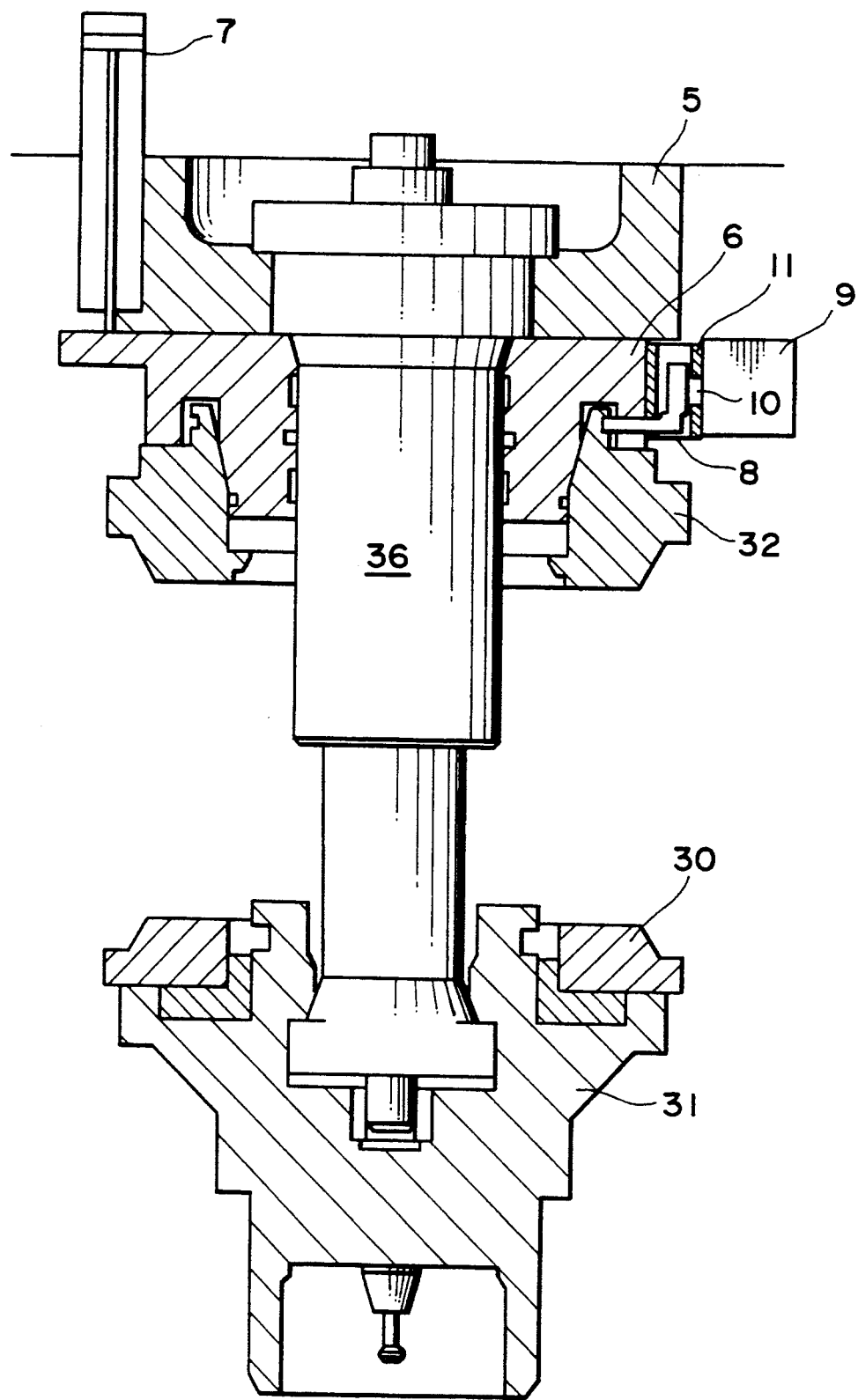
FIG. 1 is a partial sectional view of a post-cure inflator machine showing a preferred embodiment of the present invention.
Figure 2:
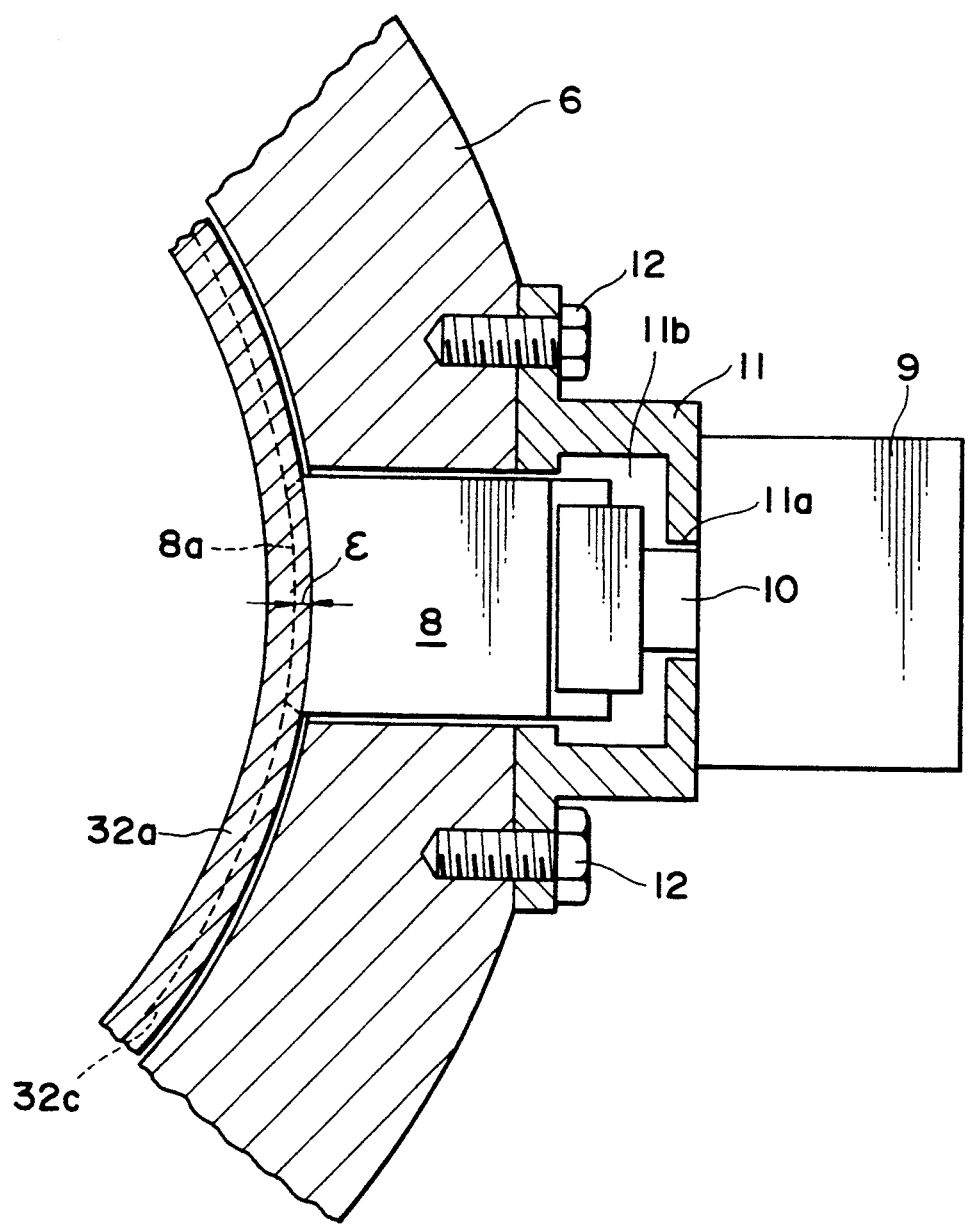
FIG. 2 is an enlarged horizontal sectional top plan view of a locking apparatus for an upper rim of the post-cure inflator machine of FIG. 1.

Subsequently, the post-cure inflator of the present invention is described more in detail with reference to FIGS. 1 to 3. Referring first to FIG. 1, the upper rim support is constituted from the first member 5 and the second member 6, and the second member 6 can be moved upwardly and downwardly toward and away from the first member 5 by the cylinder apparatus 7. In FIG. 1, reference numeral 8 denotes a latch plate, 9 a locking cylinder, 10 a cylinder rod and 11 a bracket.

The locking apparatus for the upper rim 32 is mounted on the second member 6 of the upper rim support. Referring now to FIG. 2, the locking cylinder 9 is secured to the second member 6 of the upper rim Support by means of screws 12 with a bracket 11 of a substantially channel-shaped section interposed therebetween. The cylinder rod 10 extends through a hole 11a of the bracket 11, and it is movable leftwardly and rightwardly by a distance equal to a width $\epsilon$ of an outer peripheral circumferential or annular groove 32c of the upper rim 32 in a channel-shaped inner spacing 11b of the bracket 11 so as to allow the latch plate 8 mounted at the lower portion of the cylinder rod 10 to be moved back and forth by $\epsilon$ toward and away from the upper rim 32. The latch plate 8 has a suitable width, and the inner spacing 8a thereof is cut in an arcuate shape along the outer peripheral circumferential groove 32c of the upper rim 32.

Figure 3:
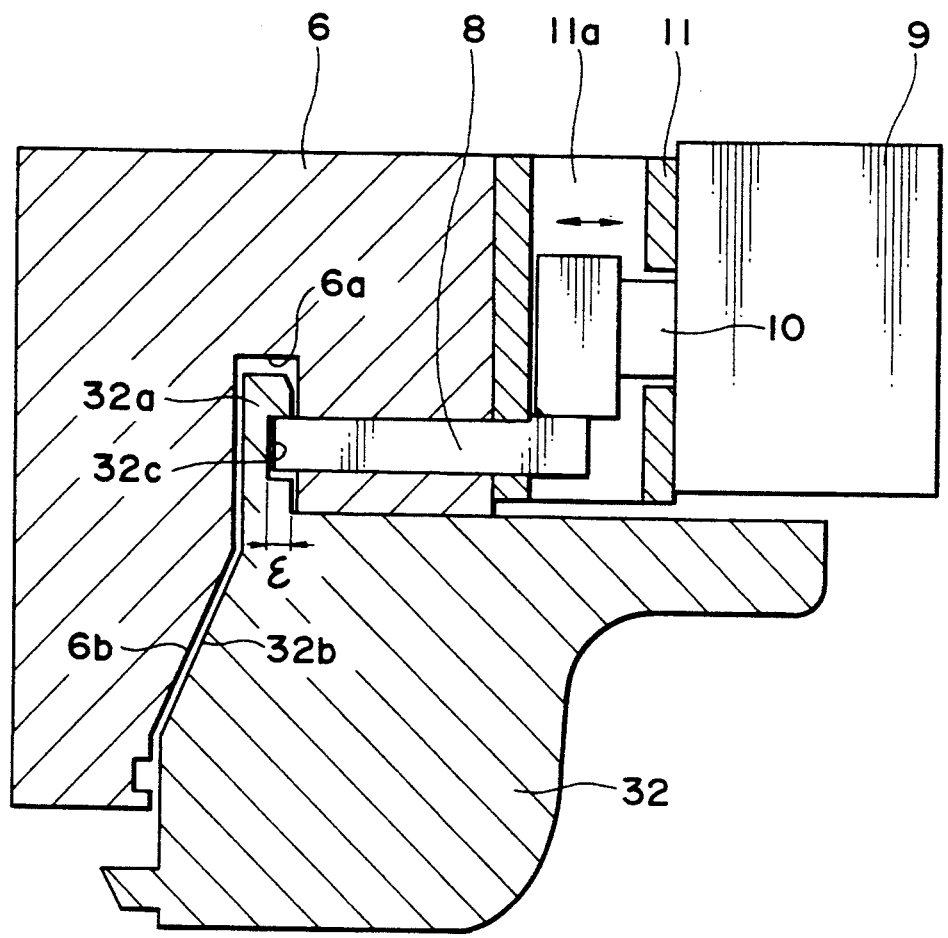
FIG. 3 is a side elevational sectional view of the locking apparatus shown in FIG. 2.

Referring now to FIG. 3, the second member 6 of the upper rim support has a tapered fitting portion 6b and has a circumferential groove 6a formed at a root portion of the fitting portion 6b. The upper rim 32 has in the inside thereof a conical inclined face 32b and an upper end projection 32a conforming to the fitting portion 6b and the circumferential groove 6a, respectively, of the second member 6 of the upper rim support, and an outer circumferential groove 32c is formed on the outer side of the upper end portion 32a. The latch plate 8, which is moved by the locking cylinder 9, can be fitted into the outer circumferential groove 32c of the upper rim 32 and lift the upper rim 32 and keep the upper rim 32 in the lifted condition or can be removed from the outer circumferential groove 32c to release the upper rim 32.

Figure 4:
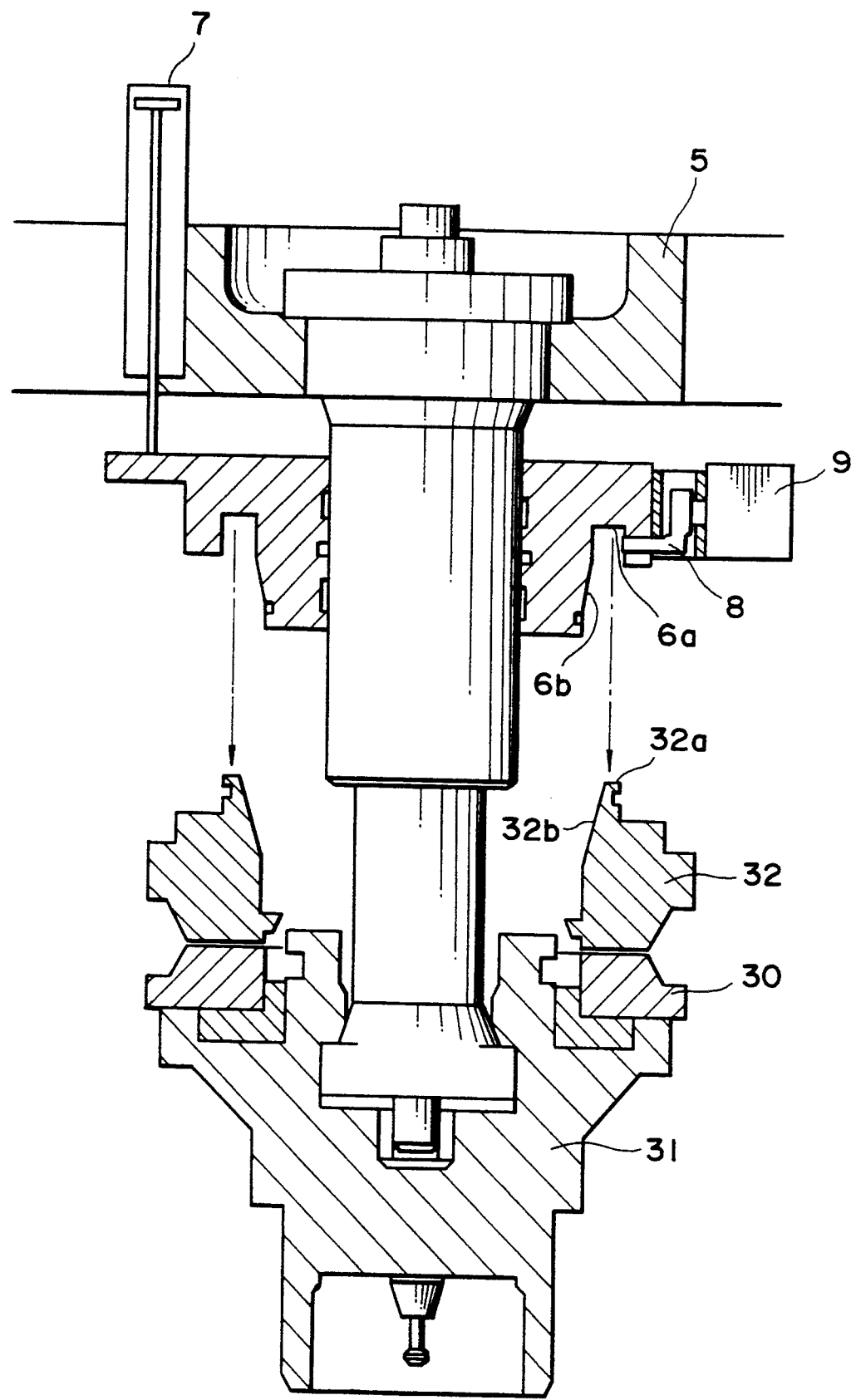
FIG. 4 is a vertical sectional view illustrating operation of the post-cure inflator machine of FIG. 1.

Operation of the post-cure inflator of the present invention is described subsequently. Referring now to FIG. 4, the upper rim 32 is first placed onto the lower rim 30, and the lifting apparatus 33 is rendered operative to lift the lower rim support 31, whereupon also the upper rim 32 is lifted. During the lifting movement, the lower rim 30 is first attached to the lower end of the locking shaft 36 as described above, and once the lower rim 30 is attached, it is not lifted any more by the lifting apparatus 33. Then, the second member 6 of the upper rim support is moved down by a lifting apparatus 7. Thereupon, the upper end projection 32a of the upper rim 32 is guided by the tapered fitting portion 6b of the second member 6 into the circumferential groove 6a. Thus, the upper rim 32 is positioned with respect to the second member 6 of the upper rim support by the fitting between the circumferential groove 6a of the second member 6 of the upper rim support and the upper end projection 32a of the upper rim 32. Then, the locking cylinder 9 is rendered operative. Consequently, the latch plate 8 is projected thereby to attach the upper rim 32 to the second member 6 of the upper rim support. Subsequently, the second member 6 is lifted. Consequently, the upper rim 32 is lifted by the second member 6 to and then fixed at a position for the operation in a suspended condition.

Figure 6:
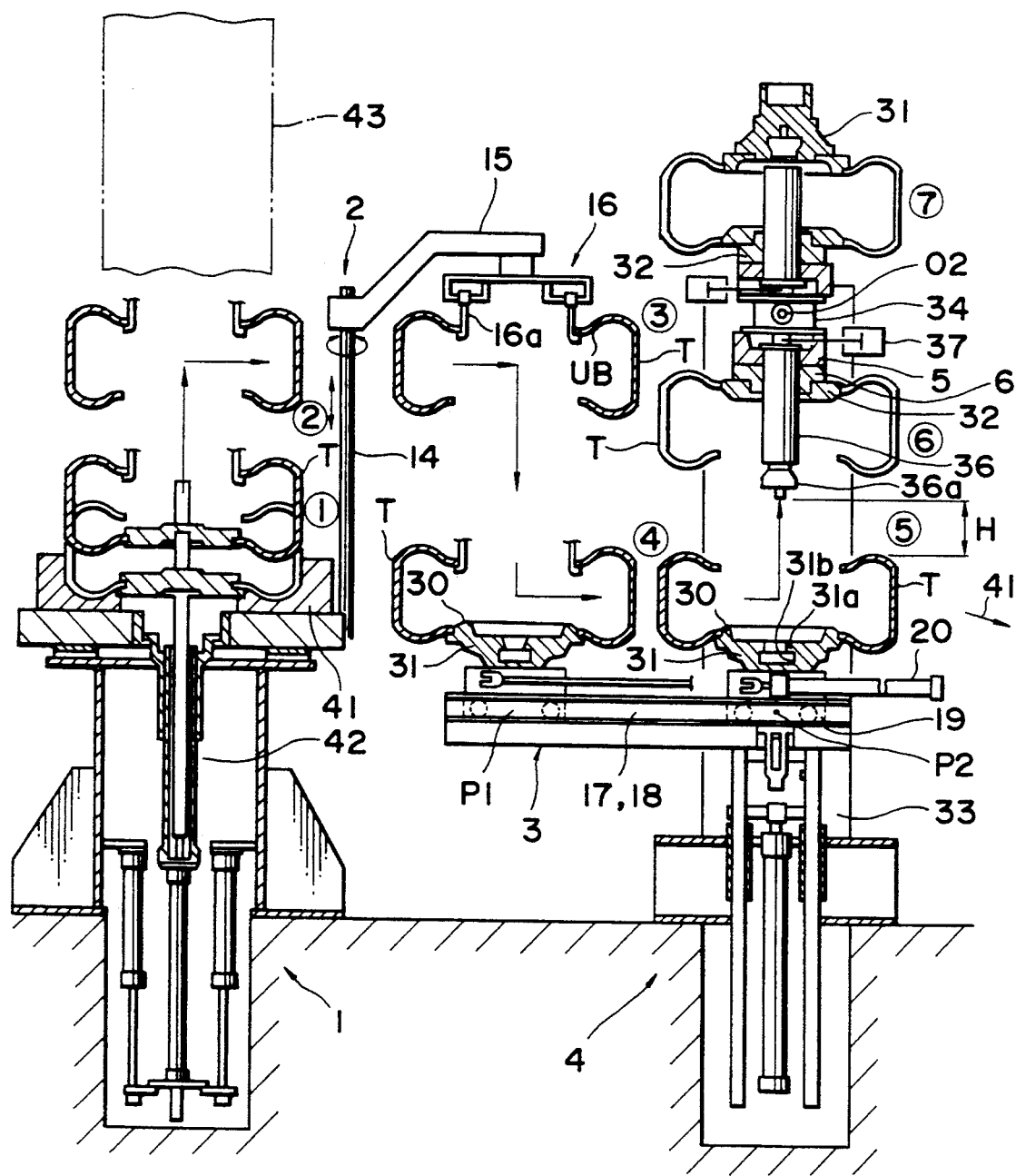
FIG. 6 is a further reduced side elevational sectional view of the post-cure inflator of FIG. 1 and a transporting apparatus.
Figure 7:
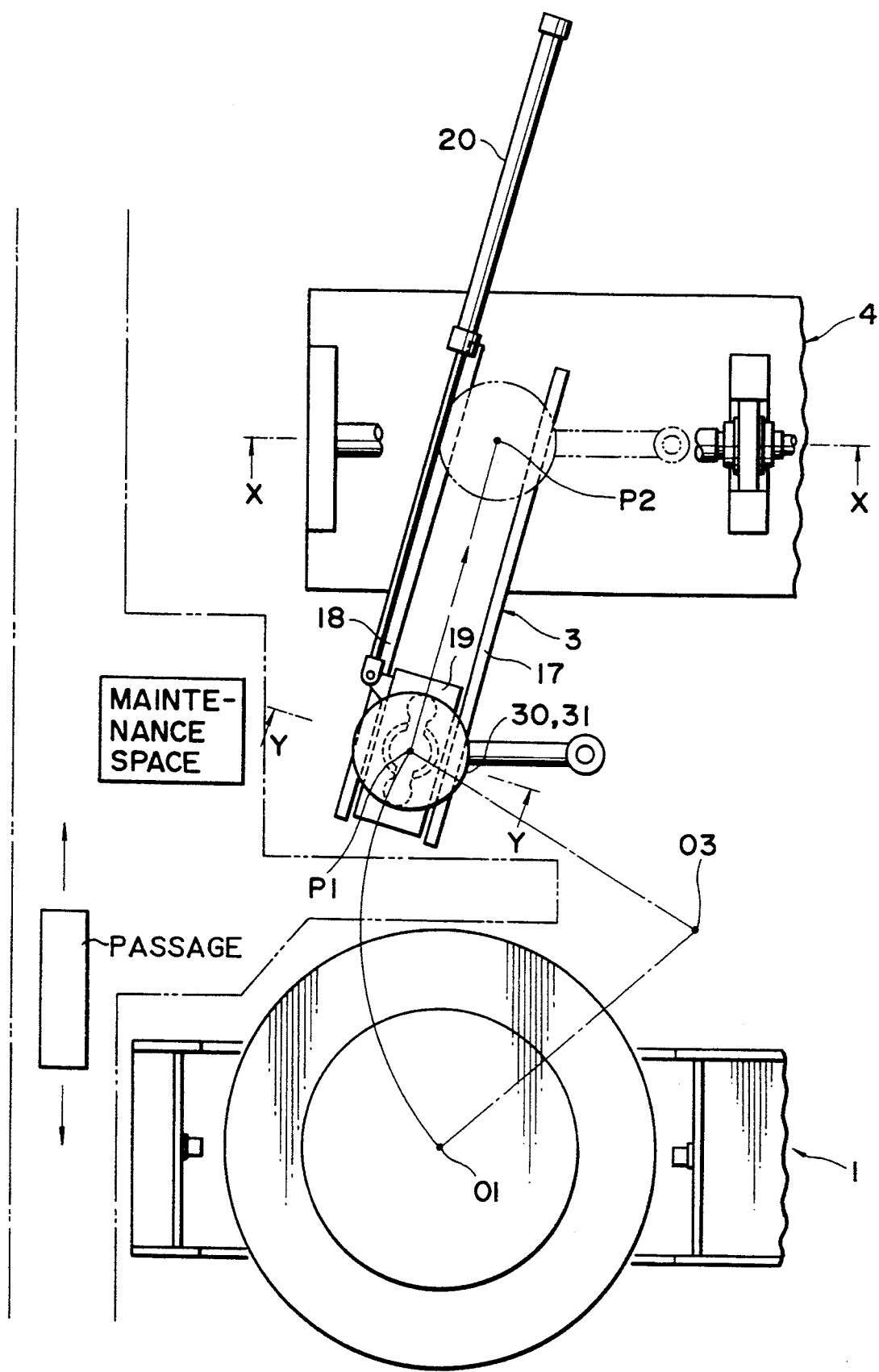
FIG. 7 is a schematic top plan view of a sliding apparatus.

Subsequently, the post-cure inflator of the present invention and an apparatus for the transportation to the post-cure inflator will be described. In the post-cure inflator which employs the transporting apparatus as shown in FIG. 6, an operator can operate in such a maintenance space as shown in FIG. 7, and accordingly, an exchanging operation for an upper rim is further convenient. Referring to FIG. 6, reference numeral 1 denotes a tire vulcanizing machine, 2 a transporting apparatus, 8 a sliding apparatus and 4 a post-cure inflator.

The tire vulcanizing machine 1 includes an upper metal mold and lower metal mold 41 which can be opened or closed by a lifting apparatus not shown and put into a clamping condition by a clamping cylinder not shown, and further includes a central mechanism 42, for example, of the standing post type provided at the center of the upper and lower metal molds 41. In the arrangement shown in FIG. 6, the upper and lower metal molds 41 are in an open condition, and a vulcanizing tire T is at the position of ① at which it is removed from the lower metal mold 41 by the central mechanism 42.

The transporting apparatus 2 is mounted at a suitable location of a frame 43 of the tire vulcanizing machine 1 and includes a vertical support column 14, a transport arm 15 which is moved vertically and pivoted on the support column 14 by a plurality of cylinder apparatus, and a chuck 16 at an end of the transport art 15. The chuck 16 has three or more pawls 16a disposed at an equal distance in a circumferential direction. The pawls 16a of the chuck 16 are expanded or contracted at a time in radial directions to increase or decrease the diameter of the pawl arrangement by means of a cylinder apparatus not shown. When the pawls 16a in a reduced diameter condition are inserted into the tire T and then expanded, the tire T is gripped at an upper bead UB thereof by the pawls 16a, and then when the pawls 16a are contracted at a predetermined position, the tire T is released from the pawls 16a. The chuck 16 has a center 03 of pivotal motion as shown in. FIG. 7 and is pivoted bask and forth between the center 01 of the tire vulcanizing machine 1 and a first position P1 of the sliding apparatus 3 which will be described below. Referring back to FIG. 6, after the tire T is lifted to the position ②, the chuck 16 is pivoted to the position ③ and then moved down to the position ④.

Figure 8:
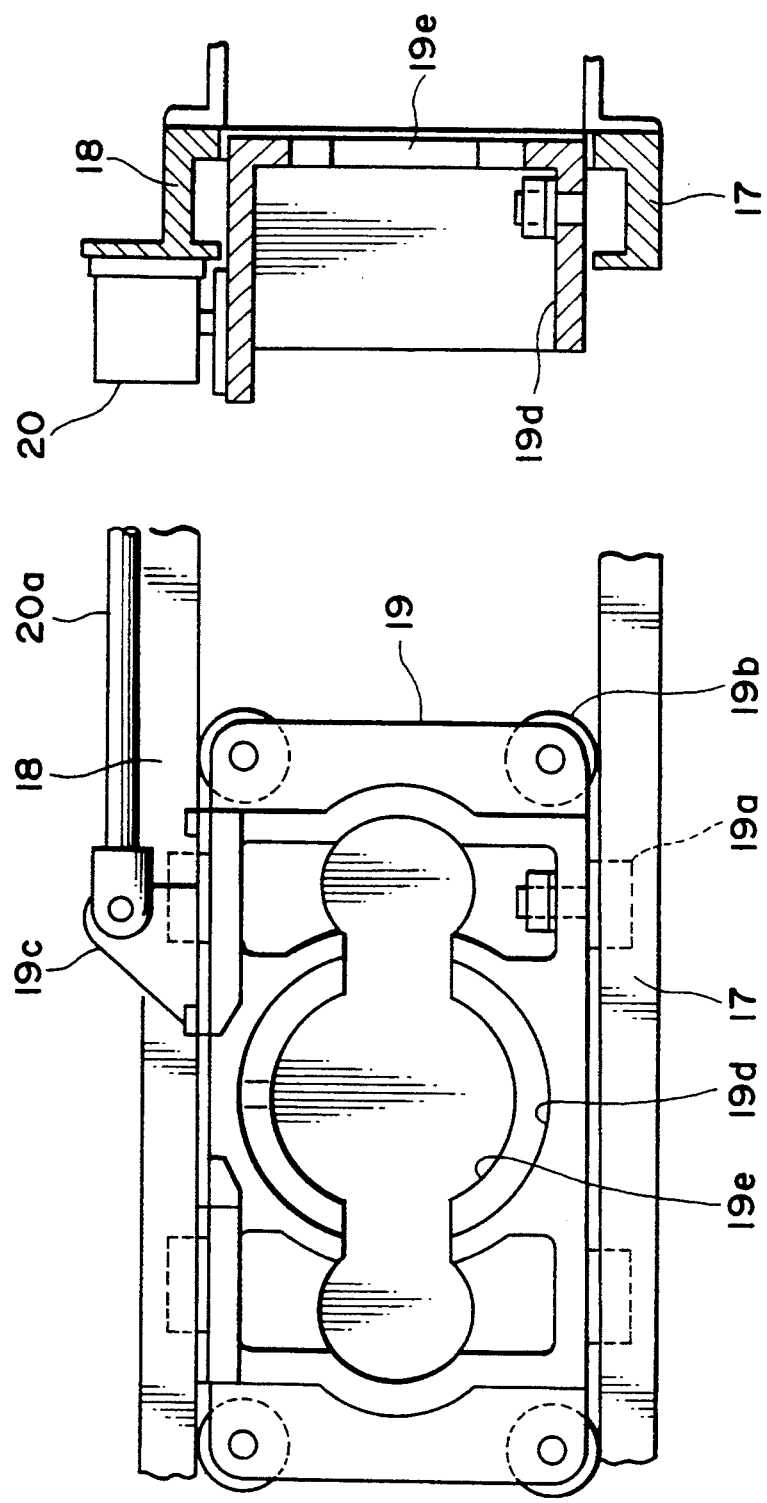
FIG. 8 is an enlarged view showing details of a carrier of the sliding apparatus of FIG. 7.

The sliding apparatus 3 moves the lower rim support 31 from the first position P1, which is an intermediate position on the vulcanizing machine 1 side, to the second position P2, which is a position below the upper rim 32 mounted on the post-cure inflator 4. At the position ④, the tire T is placed onto the lower rim support 31 and the lower rim 30. A carrier 19 is movable between the first position P1 and the second position P2 while keeping the lower rim support 31 received thereon and slidably moves the tire T from the position ④ to the position ⑤. Referring to FIG. 7, the sliding apparatus 3 includes a pair of thin rails 17 and 18 disposed in an opposing relationship to each other in a horizontal plane, the carrier 19 mounted for movement along the rails 17 and 18, and a cylinder apparatus 20 connected to the carrier 19. Referring to FIG. 8, the carrier 19 is positioned by roller followers 19a mounted for movement along a groove between the rails 17 and 18 and further roller followers 19b mounted in contact with side faces of the rails 17 and 18 for movement along the rails 17 and 18. A rod 20a of the cylinder 20 is connected to the carrier 19 by way of a bracket 19c so that the carrier 19 is moved back and forth by contracting and expanding movement of the rod 20a. Further, the carrier 19 includes a peripheral wall 19d for receiving the lower rim support 31 thereon, and a triple hole 19e through which the lifting apparatus 33 for the post-cure inflator can pass.

The post-cure inflator 4 lifts the tire T from the position ⑤ to the position ⑥ together with the lower rim 30 and the lower rim support 31 by the lifting apparatus 33. At the position ⑥, the tire T is put into an inflated and cooled condition wherein high pressure air is blown therein. Thereafter, the post-cure inflator 4 further lifts the tire T to the position ⑦ at which the tire T assumes a fully turned over position.

The operation becomes easier if the sliding apparatus 3 described above is used in exchanging the upper rim of the post-cure inflator of the present invention. In particular, in the maintenance space shown in FIG. 7, the operator will place the lower rim support 31 and the lower rim 30 onto the carrier 19 of the sliding apparatus 3 at the first position P1 and then place the upper rim 32 onto the lower rim 30. Subsequently, the carrier 19 is moved to the second position P2, and there, the lower rim support 31 and lower rim 30 and the upper rim 32 are lifted by the lifting apparatus 33 shown in FIG. 6. Then, the lifting apparatus 7 for the second member 6 of the upper rim support is rendered operative to move down the second member 6. Thereupon, the upper end 32a of the upper rim 32 is fitted into the circumferential groove 6a of the second member 6 under the guidance of the tapered portion 6b of the second member 6 as seen from FIG. 4. Then, the locking cylinder 9 is rendered operative to project the latch plate 8 into the outer circumferential groove 32c of the upper rim 32 to attach the upper rim 32 to the second member 6. Thereafter, the upper rim 32 is lifted by the lifting apparatus 7 so that it is set in position. In this manner, the lower and upper rims 30 and 32 can be exchanged only by placing the upper and lower rims 32 and 30 onto the carrier 19 in the maintenance space which is sufficiently wide for the operator to operate there. Consequently, the operator is released from a difficult operation of mounting a heavy upper rim in a small space, and also the safety of the operator is enhanced.

Having now fully described the invention, it will be apparent to one of ordinary skill in the art that many changes and modifications can be made thereto without departing from the spirit and scope of the invention as set forth herein.

What is claimed is:

1. A post-cure inflator, comprising:
   a rotary frame;
   a locking shaft mounted for rotation around a longitudinal axis thereof on said rotary frame;
   an upper rim support mounted for rotation about said axis with respect to said locking shaft;
   an upper rim removably supported on said upper rim support;
   a lower rim support removably supported on said locking shaft;

a lower rim removably supported on said lower rim support for cooperating with said upper rim to hold a vulcanized tire therebetween;

means for inflating and cooling the vulcanized tire held between said upper and lower rims;

said upper rim support and said upper rim having tapered fitting portions for cooperating with each other;

said upper rim having an outer peripheral annular groove facing radially outwardly and formed at an upper portion thereof; and a latching member mounted on said upper rim support for movement in a direction substantially perpendicular to said axis, into and out of said outer peripheral annular groove of said upper rim to selectively lock said upper rim to said upper rim support for any circumferential orientation of said upper rim with respect to said upper rim support.

2. A post-cure inflator according to claim 1, wherein said upper rim support includes a first member secured to said rotary frame, a second member mounted for movement into and out of contact with said first member, and a lifting apparatus disposed on one of said first and second members for moving said one of said first and second members toward and away from the other of said first and second members.

3. A post-cure inflator according to claim 1, wherein said latching member comprises a locking cylinder which positively moves a latch plate into said groove to lock said upper rim to said upper rim support.

4. A post cure inflator according to claim 1 wherein said upper rim support comprises a circumferential groove and said upper rim includes a projection fittable in said groove of said upper rim support.

5. A post cure inflator according to claim 4, including a locking cylinder mounted on said upper rim support, wherein said latching means comprises a latch plate connected to said locking cylinder for movement into and out of said annular groove of said upper rim.

* * * * *